United States Patent [19]

Steffes

[11] Patent Number: 4,838,225
[45] Date of Patent: Jun. 13, 1989

[54] THROTTLE REGULATOR

[75] Inventor: Helmut Steffes, Hattersheim, Fed. Rep. of Germany

[73] Assignee: Alfred Teves GmbH, Frankfurt, Fed. Rep. of Germany

[21] Appl. No.: 181,456

[22] Filed: Apr. 14, 1988

[30] Foreign Application Priority Data

Apr. 25, 1987 [DE] Fed. Rep. of Germany ....... 3713947

[51] Int. Cl.$^4$ ...................... B60K 28/16; B60K 31/00; F02D 9/02; F02D 11/02
[52] U.S. Cl. .................................. 123/342; 123/352; 123/400; 180/197
[58] Field of Search ............... 123/342, 336, 349, 352, 123/360, 361, 376, 399, 400, 401; 180/197

[56] References Cited

U.S. PATENT DOCUMENTS

| | | | |
|---|---|---|---|
| 4,397,276 | 8/1983 | Hayashida | 123/342 |
| 4,703,823 | 11/1987 | Yogo et al. | 123/399 X |
| 4,714,864 | 12/1987 | Yogo et al. | 123/349 X |
| 4,750,582 | 6/1988 | Maas | 180/197 |
| 4,785,691 | 11/1988 | Papenhagen et al. | 123/342 X |
| 4,785,782 | 11/1988 | Tanaka et al. | 123/361 X |
| 4,795,000 | 1/1989 | Ocvirk et al. | 123/342 X |

Primary Examiner—Willis R. Wolfe
Attorney, Agent, or Firm—James B. Raden

[57] ABSTRACT

A throttle regulator for the throttle of a combustion engine of an automotive vehicle for controlling the traction slip or the speed. The throttle regulator comprises two devices influencing the position of the throttle in an adding manner. The first device is operated by the driver such as by means of a pedal, and the second device is a servomotor operated on the basis of an electronically formed signal, with the basic position of the second device corresponding to a mid-position wherein the position of the throttle is influenceable both in the closing and in the opening directions. A first signal is electrically provided which corresponds to the throttle position. The first signal is compared to a reference signal provided by control electronics and an output signal is applied to the servomotor until the first signal and the reference signal conform to one another.

9 Claims, 2 Drawing Sheets

THROTTLE REGULATOR

BACKGROUND OF THE INVENTION

This invention relates to a throttle regulator for the throttle of a combustion engine of an automotive vehicle for controlling the traction slip or the speed. The throttle regulator comprises two devices influencing the position of the throttle in an adding manner. The first device is operated by the driver such as by means of a pedal, and the second device is operated on the basis of an electronically formed signal, with the basic position of the second device corresponding to a mid-position wherein the position of the throttle is influenceable both in the closing and in the opening directions.

Such a throttle regulator is disclosed in German patent application No. 36 36 417. When designing such throttle regulators the problem of decoupling the pedal operation as fast as possible from the throttle when traction slip control becomes necessary must be dealt with. In this regard, in the cited specification it is suggested to lock the first regulating unit so that a movement of the pedal will only come about against the force of a spring, but will have no influence on the throttle position. To lock the first regulating unit, it is suggested to equip a cable portion between the pedal and a deflection pulley with a solid rod embraced by a clamping device. Such clamping devices are disadvantageous in that they are very slow-acting so that the driver will continue to have an influence on the driving performance of the engine although traction slip control is considered necessary.

SUMMARY OF THE INVENTION

It is therefore an object of the present invention to reduce the response times of traction slip control and to bring about a cost reduction of the device.

This object is achieved in that an actual signal is formed which corresponds to the throttle position and which is compared with a reference signal formed by a control electronics and wherein, for traction slip control or for speed control, the second regulating unit is actuated so as to effect an adaptation of the reference and actual signals. The adjusting device in accordance with the present invention comprises a cable guided by way of a deflection pulley. The cable is operated by the pedal while the deflection pulley position is influenced by a servomotor receiving its signals from a control electronics. The basic position of the deflection pulley is defined as a mid-position, which allows both forward and backward movements, and therefore it will be possible to realize a speed control. For the generation of the actual signal, a potentiometer can be used, with the sliding contact being fastened at the cable portion between the throttle and the deflection pulley.

BRIEF DESCRIPTION OF THE DRAWING

The present invention will now be described in the following detailed description taken in conjunction with the accompanying drawing wherein.

DETAILED DESCRIPTION OF A PREFERRED EMBODIMENT

Figure 1:
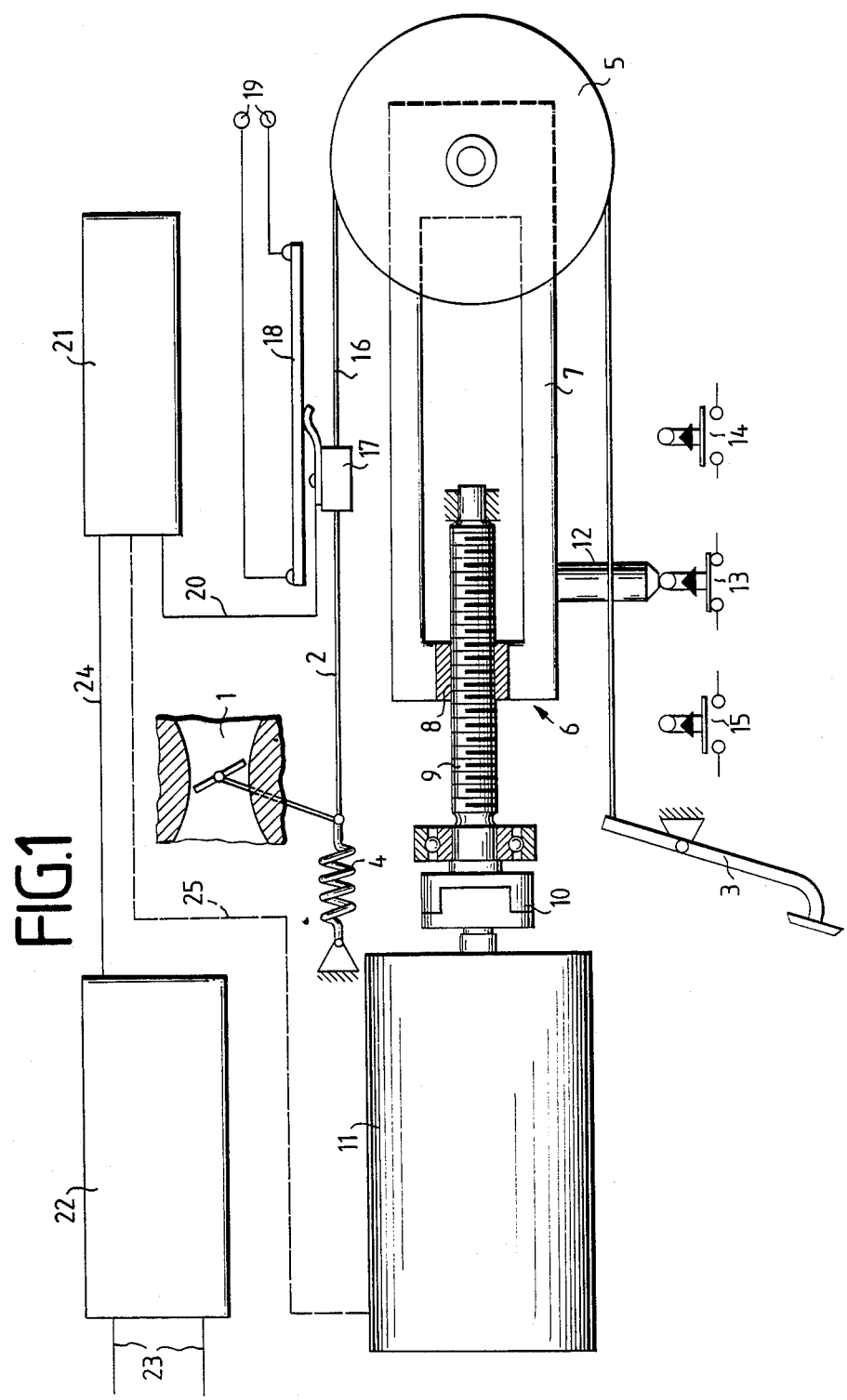
FIG. 1 is a combined plan view and schematic diagram which shows the mode of operation of the throttle regulator in accordance with the present invention; and, FIGS. 2a and 2b are top and side views in partial section of the throttle regulator in accordance with the present invention.

Referring now to FIG. 1, a throttle 1 is acted upon by a cable 2 actuated by an accelerator pedal 3 against the force of a spring 4. The spring 4 acts on the throttle in the sense of a closing motion. Cable 2 runs by way of a deflection pulley 5, which provides a change in direction of approximately 180°. The deflection pulley 5 is rotatably fastened at a holder 6. The holder 6 consists of a frame 7. At one of the ends thereof, the deflection pulley 5 is rotatably supported. At the other end, a thread portion 8 is provided into which thread 8 a spindle 9 is screwed. The spindle 9 is coupled to an electric motor 11 via a clutch 10. The electric motor 11 causes a rotary motion of the spindle 9, thereby the frame 7 being moved forwards and backwards, depending on the direction of rotation of the motor, in guide rails (not shown). Further, an actuating pin 12 is fastened at the frame. Actuating pin 12 cooperates with a mid-position switch 13 and with the limit switches 14 and 15.

At the cable portion 16 between the throttle and the deflection pulley 5, a sliding contact 17 is fastened which can slide conductively along an electric resistor 18. The voltage of a voltage source 19 is applied to the resistor 18 so that, depending on the position of the sliding contact 17, a voltage signal is supplied to the comparator 21 by way of a line 20. Further, a control electronics 22 is provided which, by way of signal lines 23 receives signals corresponding to the rotary motions of the wheels. The signals are processed and formed into a reference signal which, by way of the control line 24, is likewise fed to the comparator 21. In response to the reference and actual signals, the comparator 21 can supply a command signal to the electric motor 11 by way of a command line 25.

The described system works as follows: Upon a depression of the pedal 3, the throttle 1 will be actuated in the usual manner so as to open. Consequently, the driving wheels of the associated vehicle will be driven with a torque corresponding to the throttle position. The holder 6 and, hence, the deflection pulley 5 will remain in their basic positions defined by switch 13. Should, in case of no control, the actuating pin 12 not have closed switch 13, a signal will be supplied to servomotor 11 at once, whereby the holder 6 again will be returned into its mid-position. This will also be the case when a control operation has been completed and the holder 6 is not in its basic position.

Now, if the control electronics 22 detects that any one of the driving wheels threatens to lock since the supplied torque does not correspond to the frictional conditions between tire and road surface, a corresponding reference signal will be formed (with the momentary actual signal being taken into consideration) and simultaneously the servomotor 11 will be activated to the effect that the reference signal will coincide with the actual signal. Control can be effected independently of the pedal position as a change in the throttle position influenced by the pedal position will directly be compensated by the servomotor until the actual signal corresponds to the reference signal. Readjustment can be effected very fast as the electric motor 11 can travel the entire regulated distance in a short time which in one embodiment was less than 200 milliseconds. As readjustment generally works faster than the pedal is displaced by the driver, the adjustment of the throttle now will be effected in correspondence with the reference signal, with the driver being able to fully depress the pedal without influencing the throttle position. Should the driver somehow depress the pedal 3 in less than 200 milliseconds, control can be switched off and a warning lamp can be switched on. After a time delay, control could be reactivated and switched to be ready for operation. Speed control could be effected in a similar manner.

Throttle regulation at first will take place in the usual manner until the desired speed will have been reached. By means of a signal to the control electronics 22, the driver can predetermine the reached speed as a desired value, with the control electronics forming a corresponding reference signal. The driver now releasing the pedal 3, the comparator 21 will supply a corresponding signal to the electric motor 11. Electric motor 11 will displace the deflection pulley 5 until the reference signal and the actual signal coincide, with a pedal movement simultaneously being compensated. Speed control can be switched off by applying the brake or by actuating the acceleration pedal beyond the reference position.

Finally, it is pointed out that the actual signal can be generated in various ways. For instance, it is possible to register the angular position of the deflection pulley 5 by a binary code and to process this value as an actual signal for the comparator 21. The potentiometer 17, 18 advantageously can also be fastened to the deflection pulley 5, with either the sliding contact 17 being arranged at the deflection pulley 5 and the resistor 18 being arranged at the holder 6 or with the sliding contact 17 and the resistor 18 being mounted just the other way round. This arrangement is less complicated as the fastening of the sliding contact 17 to the cable 2 could involved added problems.

The arrangement of the potentiometer 17, 18 at the deflection pulley 5 and at the holder 6 further is advantageous in that it is self-adjusting. To this end, either the sliding contact 17 or the resistor 18 must be connected with the holding element by way of a safety clutch. Upon a first depression of the pedal, the sliding contact will reach an abutment at the end of the resistor 18 so that the sliding contact 17 and the resistor 18 will jointly be displaced until the pedal will have been depressed fully. The complete opening of the throttle then unequivocally will be linked to a certain voltage value.

Upon a first depression of the pedal the frictional force in the safety clutch must be overcome. Upon the release of the pedal, the sliding contact 17 will move along the resistor 18, with the once defined position of the parts relative to the holding elements being maintained. The ensuing sliding forces cannot overcome the frictional forces of the clutch.

Figure 2A:
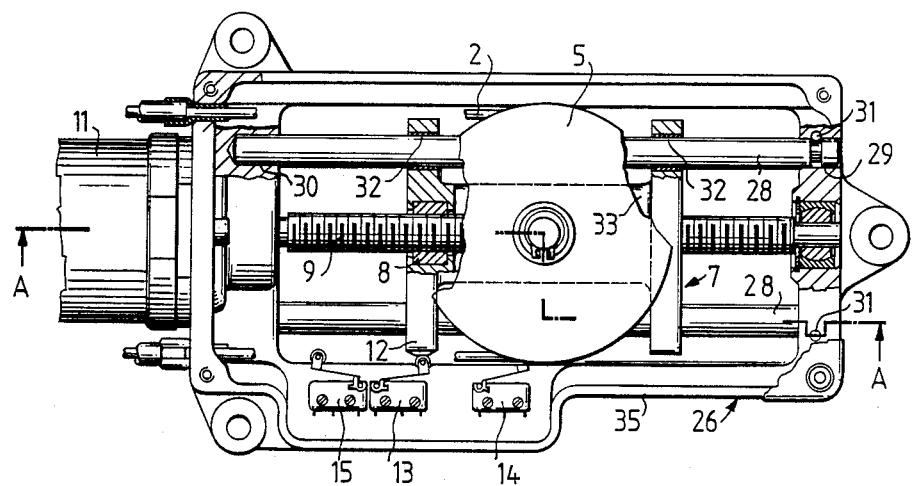
Figure 2B:
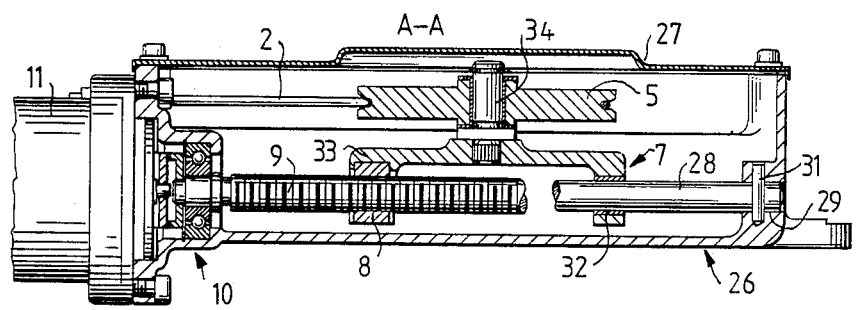

In FIGS. 2a and 2b, one embodiment of the mechanical device in accordance with the present invention is illustrated. FIG. 2a shows a plan view, FIG. 2b showing a section along line A—A of FIG. 2a. The deflection pulley 5, the frame 7, and the switches 13, 14, and 15 are arranged in a housing 26. The housing is in the shape of a box and is closed by a cover 27. Within the housing, two rod-shaped guide rails 28 extend which can be introduced into the interior of the housing through two lateral bores 29 and which are received in pocket bores 30 of the opposite housing wall. The guide rods 28 are secured by cotters 31 in the bores 29.

The frame 7 has the shape of a double T. In the arms of the T, guide bores 32 are formed which receive the guide rods 28. The arms of the double T are connected with each other by a base 33. Fastened at the base 33 is an axle 34 onto which the deflection pulley 5 is placed and secured by means of a retaining ring. The axle 34 of the deflection pulley 5 is located in the middle between the two guide rods 28. Parallel to the guide rods 28, the spindle 9 is inserted which is rotatably supported on both housing sides. The spindle 9 extends exactly underneath the axle 34 of the deflection pulley 5. On one of the sides of the double T, the spindle 9 is guided in a thread 8 connected with the frame 7.

Screwed to one of the housing sides is the servomotor 11, with the motor 11 and the spindle 9 being connected with each other by way of a clutch 10. The switches 13, 14, and 15 are designed as microswitches arranged in a housing wall 35 running parallel to the guide rods 28. One arm of the double T is designed as an actuating pin cooperating with the actuating devices of the switches 13, 14, 15. After assembly of the individual components within the interior of the housing, the housing is closed by the cover 27.

What is claimed is:

1. A regulating unit for the throttle of a combustion engine of an automotive vehicle for controlling the traction slip or the speed, comprising first and second devices influencing the position of the throttle in an adding manner, wherein said first device is operated by the driver by means of a pedal and wherein said second device is operated on the basis of an electronically formed signal, wherein the basic position of the second device corresponds to a mid-position whereby the position of the throttle is influenceable both in the closing and in the opening directions, wherein an actual signal is formed which corresponds to the throttle position and which is compared with a reference signal formed by a control electronics and wherein for traction slip control and speed control, the second device of said regulating unit is actuated so as to conform the reference and actual signals.

2. The throttle regulator as claimed in claim 1, wherein the throttle is actuated by a pedal-operated cable against the force of a spring, with the cable being guided by way of a variable position deflection pulley.

3. The throttle regulator as claimed in claim 2, wherein the deflection of the cable is approximately 180°, with the change in the position of the deflection pulley being parallel to the cable position.

4. The throttle regulator as claimed in claim 1, wherein sliding contact is fastened at the cable portion between the throttle and the deflection pulley, which sliding contact conductively slides along an electric resistor, with the generated voltage signal being supplied as an actual signal to the comparator.

5. The throttle regulator as claimed in claim 1, wherein the second device of said regulating unit has an electric motor acting on the position of the deflection pulley by way of a spindle-and-nut combination wherein the rotary motion of the motor is transmitted into a longitudinal motion of the deflection pulley holder.

6. The throttle regulator as claimed in claim 1, wherein a control electronics provides a reference signal which is supplied to the comparator.

7. The throttle regulator as claimed in claim 1 wherein the comparator sends a command signal to the servomotor for a compensation of the reference and actual signals for traction slip control and a desired speed control.

8. The throttle regulator as claimed in claim 1 wherein an actuating pin is arranged at the deflection pulley holder, which pin acts on a mid-position switch wherein the servomotor is activated, in the absence of control so that the actuating pin remains abutted against the mid-position switch.

9. The throttle regulator as claimed in claim 1 wherein limit switches are provided which are acted upon the actuating pin.

* * * * *